(12) United States Patent
Jahns et al.

(10) Patent No.: US 8,334,350 B2
(45) Date of Patent: Dec. 18, 2012

(54) AQUEOUS POLYMER DISPERSIONS, PROCESSES FOR PREPARING THEM, AND THEIR USE

(75) Inventors: Ekkehard Jahns, Weinheim (DE); Sebastian Roller, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/746,869

(22) PCT Filed: Dec. 16, 2008

(86) PCT No.: PCT/EP2008/067620
§ 371 (c)(1),
(2), (4) Date: Jun. 8, 2010

(87) PCT Pub. No.: WO2009/080614
PCT Pub. Date: Jul. 2, 2009

(65) Prior Publication Data
US 2010/0255321 A1    Oct. 7, 2010

(30) Foreign Application Priority Data
Dec. 21, 2007    (EP) .................................. 07150307

(51) Int. Cl.
*C08F 6/00*    (2006.01)
*C08F 2/24*    (2006.01)
(52) U.S. Cl. ............ 526/80; 526/87; 526/287; 526/288; 526/307.6; 526/307.7; 526/317.1; 526/318.2
(58) Field of Classification Search ................. 526/80, 526/87, 287, 288, 307.6, 307.7, 317.7, 318.2
See application file for complete search history.

(56) References Cited

U.S. PATENT DOCUMENTS

| | | | |
|---|---|---|---|
| 3,043,790 A | 7/1962 | Sanders et al. | |
| 3,196,122 A | 7/1965 | Evans et al. | |
| 3,239,479 A | 3/1966 | Roenicke et al. | |
| 4,269,749 A | 5/1981 | Marriott et al. | |
| 4,340,510 A | 7/1982 | Howanietz et al. | |
| 5,468,799 A * | 11/1995 | Aydin et al. | 524/457 |
| 5,496,882 A | 3/1996 | Aydin et al. | |
| 6,306,460 B1 | 10/2001 | Reck et al. | |
| 6,566,472 B1 * | 5/2003 | Baumstark et al. | 526/263 |
| 2004/0191199 A1 * | 9/2004 | Mougin | 424/70.11 |
| 2004/0236005 A1 * | 11/2004 | Scheerder et al. | 524/523 |

FOREIGN PATENT DOCUMENTS

| | | |
|---|---|---|
| DE | 2 164 256 | 6/1973 |
| DE | 38 27 975 | 3/1990 |
| DE | 39 01 073 | 7/1990 |
| DE | 40 03 422 | 8/1991 |
| DE | 40 03 909 | 8/1991 |
| DE | 43 17 035 | 11/1994 |
| DE | 43 17 036 | 11/1994 |
| DE | 44 19 518 | 12/1995 |
| DE | 44 35 422 | 4/1996 |
| DE | 44 35 423 | 4/1996 |
| DE | 195 14 266 | 10/1996 |
| DE | 103 43 726 | 5/2005 |
| EP | 0 040 419 | 11/1981 |
| EP | 0 320 865 | 6/1989 |
| EP | 0 417 568 | 3/1991 |
| EP | 0 469 295 | 2/1992 |
| EP | 0 821 660 | 2/1998 |
| EP | 0 915 071 | 5/1999 |
| GB | 1 505 558 | 3/1978 |
| JP | 55 144 273 | 11/1980 |
| JP | 1 131 533 | 5/1989 |
| JP | 8 337738 | 12/1996 |
| JP | 08337738 A * | 12/1996 |
| WO | 03 029300 | 4/2003 |
| WO | 2008 152017 | 12/2008 |

OTHER PUBLICATIONS

U.S. Appl. No. 12/996,306, Dec. 3, 2010, Bette, et al.
Coskun, R. et al., "Study of Free Radical Copolymerization of Itaconic Acid/2-Acrylamido-2-Methyl-1-Propanesulfonic Acid and Their Metal Chelates", European Polymer Journal, vol. 42, No. 3, pp. 625-637, (2006) XP002524370.

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

The present invention relates to an aqueous polymer dispersion whose dispersed addition polymer P comprises, copolymerized in free-radically polymerized form, at least one polar monomer having a water solubility of greater than 50 g/liter (measured at 20° C.), and obtainable by free-radically initiated aqueous emulsion polymerization, the polar monomer being metered to the reaction mixture during the polymerization process at a variable, i.e., nonconstant rate, for example in the sense of a rate gradient. The present invention further relates to processes for preparing these aqueous polymer dispersions, to their use as binders and/or in coatings, and also to coatings comprising the polymer dispersion of the invention.

20 Claims, No Drawings

AQUEOUS POLYMER DISPERSIONS, PROCESSES FOR PREPARING THEM, AND THEIR USE

The present invention relates to an aqueous polymer dispersion whose dispersed addition polymer P comprises, copolymerized in free-radically polymerized form, at least one polar monomer having a water solubility of greater than 50 g/liter (measured at 20° C.), and obtainable by free-radically initiated aqueous emulsion polymerization, the polar monomer being metered to the reaction mixture during the polymerization process at a variable, i.e., nonconstant rate, for example in the sense of a rate gradient. The present invention further relates to processes for preparing these aqueous polymer dispersions, to their use as binders and/or in coatings, and also to coatings comprising the polymer dispersion of the invention.

Aqueous polymer dispersions of the prior art for use as binders or in coatings are typically prepared using monomers that include stabilizing monomers. These stabilizing monomers are, for example, acrylic acid or acrylamide. These stabilizing monomers, however, are polar and may bring with them a number of disadvantages when these dispersions are used as binders or in coatings. One disadvantage, for example, is a higher level of water absorption by the films, which is often unwanted. This water absorption harbors the risk of leaching of low molecular mass constituents of the coating on prolonged weathering, such as of surface-active substances, which are frequently used in the preparation of the aqueous formulations. Water absorption is manifested, for example, in increased blushing or in embrittlement of the coating. Moreover, the absorption of water, owing to the associated swelling of the polymer, results in a reduction in a coating's mechanical stability. In the case of pigmented coatings, moreover, there is a risk of the perceived color undergoing adverse alteration as a result of the absorption of water or the blushing of the coating.

Aqueous polymer dispersions of the prior art are used as binders or as additives for mineral and nonmineral materials and also in coating materials, more particularly for the coating of wood, glass, plastics, metals, mineral surfaces, and shaped mineral articles, such as roof tiles made with concrete, including slurried concrete, paving blocks, fiber cement coatings, bitumen coatings, and binders for colored stone renders, which are said to be distinguished by low levels of water absorption and at the same time not to alter, deleteriously, their strength or their visual appearance even on prolonged exposure to moisture.

Colored stone renders are composed of colored particles of sand or natural stone of millimeter size and of a usually transparent binder which holds the overall coating together after drying. Colored stone renders are often employed on the outside of buildings, primarily in the base region. There they are exposed to a particular extent to the effects of weathering, such as rain or splashing water. Moreover, they are highly visible and ought to be free from any visible water absorption, in the form, for example, of blushing.

Bitumen coatings protect bituminous roofing materials in the form of transparent or colored coatings. They are often dark in color, red or else black, for example. With these dark coatings, adverse effects on the binder, such as substantial water absorption or blushing, are particularly obvious to the eye.

Here and below, shaped mineral articles are, more particularly, shaped articles which have a mineral binder. Specifically a shaped article is an article which comes about from a mixture (a mortar) comprising a mineral binder, water, aggregates, and, if appropriate, auxiliaries after shaping through the hardening of the mineral binder/water mixture as a function of time, if appropriate under exposure to elevated temperature. Mineral binders are common knowledge. They are finely divided inorganic substances such as lime, gypsum, clay and/or cement, which are stirred up with water to convert them into their ready-to-use form, which, when left to itself, undergoes stonelike solidification as a function of time, in the air or else under water, if appropriate with exposure to elevated temperature.

The aggregates are generally composed of granular or fibrous, natural or synthetic stone (gravel, sand, mineral fibers), including in special cases metals as well, or organic aggregates, or mixtures of said aggregates, with particle sizes or fiber lengths that are adapted in a conventional manner to the particular end use. Chromatic pigments as well are frequently used as aggregates for the purpose of coloring.

Particularly suitable auxiliaries are those substances which accelerate or retard the hardening or which influence the elasticity or porosity of the solidified, shaped mineral article. The auxiliaries in question are more particularly addition polymers of the kind known, for example, from U.S. Pat. No. 4,340,510, GB-B 15 05 558, U.S. Pat. No. 3,196,122, U.S. Pat. No. 3,043,790, U.S. Pat. No. 3,239,479, DE-A 43 17 035, DE-A 43 17 036, JP-A 91/1131 533, and other documents.

Examples of shaped mineral articles for coating in accordance with the invention are concrete pipes, of the kind used to transport waste water (cf., e.g., JP-A 55/144 273), concrete roof tiles (cf., e.g., DE-A 21 64 256 or DE-A 39 01 073) or curbstones, steps, floor slabs, base slabs based on mineral binders, and also fiber cement slabs, i.e., flat, shaped mineral articles filled with organic or inorganic fibers, such as polyester fibers or nylon fibers, for example.

A disadvantage of shaped mineral articles is that, under the influence of weathering (more particularly exposure to water), the cationic constituents, such as $Ca^{2+}$, are leached out over the course of time, reducing the strength of the articles. Another disadvantageous property of shaped mineral articles is the incidence of efflorescence phenomena. These phenomena are probably attributable to the fact that the mineral binders comprise polyvalent cations such as $Ca^{2+}$ in an alkaline environment. Reaction with the carbon dioxide from the air may therefore cause the formation, on the surface of the shaped mineral articles, of white lime spots which are unsightly and are relatively insoluble in water. The phenomenon of efflorescence may occur either during the actual hardening of freshly prepared, shaped mineral articles, or on exposure to weathering of shaped mineral articles which have already hardened.

In order to avoid the aforementioned disadvantageous properties, the shaped mineral articles are frequently provided with a coating. For this purpose use is generally made nowadays of aqueous coating systems whose film-forming constituent is an aqueous polymer dispersion. Typical binders comprise styrene/acrylic ester copolymers, homopolymers and copolymers of vinyl acetate, straight acrylates, and the like (cf., e.g., DE 21 64 256). However, the coatings obtainable with these binders are unable satisfactorily to prevent the emergence of the cationic constituents (efflorescence). Furthermore, coatings of this kind are easily soiled.

Since lime efflorescence occurs during the actual setting of the cement, it is important to apply the coating, as protection against efflorescence, to the concrete even before it has cured, which is referred to as green concrete. After curing or setting it is possible, if appropriate, to carry out coating a second or further times with a paint or with a clearcoat material, with subsequent drying in each case.

For the smoothing or coloring of shaped mineral articles, more particularly of concrete roof tiles, it is also possible to use a cement-bound mineral coating material (known as a cement slurry). This slurry is composed substantially of cement, water, and pigments, and also, if appropriate, of ultrafine sands. Immediately following its application to the concrete molding, and before curing or setting, this coating material is coated with a transparent varnish. The function of this varnish is to prevent lime efflorescence and to enhance the weathering stability. The transparent varnish applied in this process greatly influences the gloss of the cured concrete molding.

The roof tile paints or clear varnishes based on aqueous polymer dispersions that are typically used to coat shaped mineral articles do lead to sufficient protection against efflorescence or to an acceptably low soiling tendency, but the resulting surfaces, in the case of the coating of colored, cement-bound mineral coating materials, after the curing and the drying of the clearcoat material, are only very matt.

DE-A 38 27 975 and DE-A 40 03 909 disclose coatings for concrete slabs that are based on aqueous polymer dispersions comprising at least one aromatic ketone as a photosensitizer. As a result of the photosensitizer there is superficial crosslinking of the coating. Although it is possible in this way largely to lessen the unwanted efflorescence phenomena, the coatings are nevertheless unstable on prolonged weathering.

The protection of shaped mineral articles from the above-described efflorescence has also been improved by means of coating materials based on styrene/acrylate dispersions or straight-acrylate dispersions of EP-A 469 295 and DE-A 195 14 266. EP-A 469 295 recommends for this purpose the use of a specific anionic emulsifier, and DE-A 195 14 266 the use of polymers comprising, in copolymerized form, specific monomers having sulfonate groups.

DE 103 43 726 discloses coated, shaped concrete articles which feature effective bloom protection through the use of an aqueous polymer dispersion and an anionic emulsifier having at least one phosphate and/or phosphonate group.

EP 915 071 discloses coatings based on copolymers of ethylenically unsaturated monomers comprising more than 0.2% to 5% by weight of itaconic acid.

Methods of preserving concrete roof tiles with an aqueous polymer dispersion comprising an addition polymer P which preferably comprises, in free-radically copolymerized form, 2-acrylamido-2-methylpropanesulfonic acid are disclosed in EP 821 660.

The prior-art coatings all have the disadvantage that their water absorption is comparatively high. This water absorption harbors the risk of leaching of low molecular mass constituents of the coating on prolonged weathering, such as of surface-active substances, which are frequently used in the preparation of the aqueous formulations. Water absorption is manifested, for example, in increased blushing or in embrittlement of the coating. Moreover, the absorption of water, owing to the associated swelling of the polymer, results in a reduction in a coating's mechanical stability and an increase in the surface slippiness, which is likewise unwanted on grounds of safety. In the case of pigmented coatings, moreover, there is a risk of the perceived color undergoing adverse alteration as a result of the absorption of water of the coating.

It was an object of the present invention, therefore, to provide binders and additives for mineral and nonmineral materials and also coating materials, more particularly for the coating of wood, glass, plastics, metals, mineral surfaces, and shaped mineral articles, such as concrete roof tiles, including slurried concrete roof tiles, paving slabs, fiber cement coatings, bitumen coatings, and binders for colored stone renders, that are distinguished by a low level of water absorption and at the same time also do not suffer deleterious alteration of their strength or their visual appearance even on prolonged exposure to moisture.

The coatings of the invention ought likewise to be distinguished by excellent blushing behavior.

Surprisingly it has been found that the water absorption and the visual appearance of coatings based on an aqueous polymer dispersion whose dispersed addition polymer P comprises in free-radically copolymerized form at least one polar monomer having a water solubility of greater than 50 g/liter (measured at 20° C.), and is obtainable by free-radically initiated aqueous emulsion polymerization, the polar monomer being metered to the reaction mixture during the polymerization process at a variable, i.e., nonconstant rate, in the sense of a rate gradient, for example, can be improved.

"By solubility in water is meant the capacity of compounds to form clear solutions in water. A prerequisite are dissociable salt groups or a defined number of hydrophilic groups distributed evenly over the molecule". (Quote: Thieme Römpp Chemielexikon Online, 2007). The water solubility of a compound can be determined by adding the compound to water, stirring and/or shaking the system, and, after a few minutes, determining whether the solution is still clear, without haze. The term "water solubility", accordingly, refers to the maximum amount of a compound in water that still just produces a clear solution. Since the water solubility is often heavily dependent on the temperature of the water, the term "water solubility" must always be stated for a defined temperature. In the present case, the water solubility is stated at 20° C. The FIGURE reported in the present case is the water solubility of the dissolved compound, in grams, in one liter of solution prepared from the compound and water, or "g/liter", for short.

The aqueous polymer dispersion of the invention is preferably an aqueous polymer dispersion whose dispersed addition polymer P comprises, copolymerized in free-radically polymerized form, at least one ethylenically unsaturated acid and/or its conjugated base, wherein the polymer P of the aqueous polymer dispersion comprises at least one monomer of the general formula I

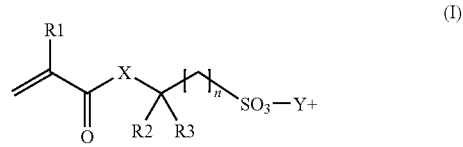

in which the variables have the following definitions:
n=0 to 2
R1, R2, R3=independently of one another hydrogen or methyl group
X=O or NH
Y=H, alkali metal, $NH_4$
and also at least one free-radically polymerizable monomer II which comprises, copolymerized in free-radically polymerized form, at least two COOX groups (where X=H, metal), and obtainable by free-radically initiated aqueous emulsion polymerization, at least one of the two monomers, i or ii, being metered to the reaction mixture during the polymerization process at a variable, i.e., nonconstant, rate in the sense of a rate gradient, for example.

The present invention further provides a process for preparing the aqueous polymer dispersion of the invention and also provides for its use as a binder and/or adjuvant for mineral and nonmineral materials, and also for its use in coating materials, more particularly for the coating of wood, glass, plastics, metals, mineral surfaces, and shaped mineral articles, such as concrete roof tiles, including slurried concrete roof tiles, paving slabs, fiber cement coatings, bitumen coatings, or as binders for colored stone renders.

The invention further provides coatings comprising the aqueous polymer dispersion of the invention, and also shaped mineral articles comprising the polymer dispersions of the invention.

The addition of the polar monomers with a water solubility of greater than 50 g/liter (measured at 20° C.) during the polymerization process results in considerably improved binders and coatings as compared with those resulting from dispersions where the polar monomers are metered in linearly, in the usual fashion, during the polymerization. More particularly the water sensitivity and the blush resistance are improved, in some cases considerably so, as a result of the inventive mode of preparation.

The addition of the monomers I and II solely in accordance with the gradient regime, as well, produces considerably improved coatings for shaped mineral articles, more particularly for concrete roof tiles, including slurried concrete roof tiles.

The optimized interactions of the aqueous coating with the ions located on the surface of the shaped articles, more particularly $Ca^{2+}$ ions, on the one hand prevents seepage and on the other hand prevents coagulation of the aqueous coating material. Surprisingly it has been found that, in contrast to linear metering, the described metering of the auxiliary monomers allows the preparation of dispersions for transparent coatings for shaped mineral articles, more particularly concrete roof tiles, including slurried concrete roof tiles, that ensure excellent protection against blooming in conjunction with excellent blushing behavior.

Aqueous polymer dispersions whose dispersed addition polymer comprises in free-radically copolymerized form at least one polar monomer having a water solubility of more than 50 g/liter are known.

The polar monomers having a water solubility of more than 50 g/liter (measured at 20° C.) comprehend, for example, α,β-monoethylenically unsaturated monocarboxylic and dicarboxylic acids, monophosphonic and diphosphonic acids, and phosphates, and their amides, examples being:
acrylic acid, methacrylic acid, maleic acid, fumaric acid, itaconic acid, aconitic acid, mesaconic acid, crotonic acid, citraconic acid, acryloyloxypropionic acid, methacryloyloxypropionic acid, vinylacetic acid, monomethyl itaconate, monomethyl fumarate, monobutyl fumarate, acrylic anhydride, methacrylic anhydride, maleic anhydride or itaconic anhydride,
acrylamidoglycolic acid and methacrylamidoglycolic acid, acrylamide, methacrylamide, and isopropylacrylamide, substituted (meth)acrylamides, such as N,N-dimethylamino (meth)acrylate, for example; 3-dimethylamino-2,2-dimethylprop-1-yl (meth)acrylate, N-dimethylaminomethyl(meth) acrylamide, N-(4-morpholinomethyl)(meth)acrylamides, diacetoneacrylamide; acetoacetoxyethyl methacrylate; N-methylol(meth)acrylamide, polyethylene oxide (meth) acrylate, methoxypolyethylene oxide (meth)acrylate, acrolein, methacrolein; N-(2-methacryloyloxyethyl)ethyleneurea, 1-(2-(3-allyloxy-2-hydroxypropylamino)ethyl)-imidazolidin-2-one, ureido (meth)acrylate, 2-ethyleneureidoethyl methacrylate,
vinylsulfonic acid, 2-acrylamido-2-methylpropanesulfonic acid (AMPS), 3'-sulfopropyl methacrylate, 3'-sulfopropyl acrylate, 2'-sulfoethyl methacrylate, vinylbenzenesulfonic acid, styrenesulfonic acid,
vinylphosphonic acid, alcohol ether phosphates copolymerizably modified with phosphate and/or phosphonate groups, such as phosphoethyl(meth)acrylate, for example; and their water-soluble salts,
hydroxyethyl(meth)acrylate and hydroxypropyl(meth)acrylates; 4-hydroxybutyl acrylate, 4-hydroxybutyl methacrylate, glycidyl(meth)acrylate,
and also N-vinylpyrrolidone, vinylimidazole.

It will be appreciated that suitability as possible monomers is also possessed by the alkali metal salts or the ammonium salts of the aforementioned acids, more particularly their sodium salts and potassium salts. It will be appreciated that, in accordance with the invention, acidic monomers whose water solubility is smaller than 50 g/liter (measured at 20° C.) can also be used in the form of their alkali metal salts or ammonium salts if this raises their water solubility to greater than 50 g/liter (measured at 20° C.).

Examples of inventively beneficial monomers of the general formula I are as follows:
2-acrylamido-2-methylpropanesulfonic acid (AMPS)
3'-sulfopropyl methacrylate
3'-sulfopropyl acrylate
2'-sulfoethyl methacrylate Examples of inventively beneficial monomers II are as follows:
itaconic acid
aconitic acid
mesaconic acid Suitable more particularly among the alkali metal salts of the monomers of the general formula I are the sodium, ammonium, and potassium salts.

With advantage the dispersed addition polymer P of the aqueous polymer dispersion for use in accordance with the invention comprises, based on its weight, 0.1% to 5%, preferably 0.2% to 2%, more preferably 0.2% to 1.5%, and very preferably 0.3% to 1% by weight of at least one monomer of the general formula I and also 0.2% to 5%, preferably 0.5% to 2%, more preferably 0.5% to 1.5%, and very preferably 0.7% to 1.2% by weight of the monomer II.

The preparation of the addition polymer P for use in accordance with the invention takes place advantageously by the method of free-radical polymerization, with suitable comonomers of the monomers I and II being monomers that are different from I and II and contain at least one ethylenically unsaturated group. Examples of suitable such monomers include olefins such as ethylene, vinylaromatic monomers such as styrene, α-methylstyrene, o-chlorostyrene or vinyltoluenes, esters of vinyl alcohol and monocarboxylic acids having 1 to 18 C atoms, such as vinyl acetate, vinyl propionate, vinyl n-butyrate, vinyl laurate, vinyl pivalate, and vinyl stearate, and also commercially available monomers VEOVA® 9-11 (VEOVA X is a trade name of the company Shell and stands for vinyl esters of carboxylic acids, which are also referred to as Versatic® X acids), esters of α,β-monoethylenically unsaturated monocarboxylic and dicarboxylic acids containing preferably 3 to 6 C atoms, such as, more particularly, acrylic acid, methacrylic acid, maleic acid, fumaric acid, and itaconic acid, with alkanols containing generally 1 to 12, preferably 1 to 8, and more particularly 1 to 4 C atoms, such as, in particular, methyl, ethyl, n-butyl, isobutyl, tert-butyl, and 2-ethylhexyl acrylates and methacrylates, dimethyl maleate or n-butyl maleate, nitriles of α,β-monoethylenically unsaturated carboxylic acids, such as acrylonitrile, and also $C_{4-8}$ conjugated dienes such as 1,3-butadiene and isoprene. The stated monomers generally form the principal monomers, which, based on the total amount of the monomers to be polymerized, normally make up a proportion of at least 90% by weight. As a general rule the solubility of these monomers in water under standard conditions (25° C., 1 atm) is low.

Monomers which have a heightened water solubility under the aforementioned conditions are, for example, α,β-monoethylenically unsaturated monocarboxylic and dicarboxylic acids and their amides, such as acrylic acid, methacrylic acid, maleic acid, fumaric acid, itaconic acid, acrylamide, and methacrylamide, and also vinylsulfonic acid, and the watersoluble salts thereof, such as N-vinylpyrrolidone. It will be appreciated that the alkali metal salts or the ammonium salt of the aforementioned acids are also suitable as possible monomers, more particularly their sodium and potassium salts. These monomers which have a heightened water solubility are normally copolymerized into the polymer P only in amounts such that, together with the amount of the monomers of the general formula I and II that are to be copolymerized, their amount does not exceed 10% by weight, preferably 5% by weight, based on the total amount of the monomers to be polymerized. Higher levels of these monomers generally have the effect of lessening the water resistance of the preservative coating of the invention.

Monomers which typically enhance the internal strength of films formed from aqueous polymer dispersions normally contain at least one epoxy, hydroxyl, N-methylol or carbonyl bond or at least two nonconjugated ethylenically unsaturated double bonds. Examples of such monomers are N-alkylolamides of β,β-monoethylenically unsaturated carboxylic acids containing 3 to 10 C atoms, and also their esters with alkanols containing 1 to 4 C atoms, with very particular preference among these being given to N-methylolacrylamide and N-methylolmethacrylamide; monomers containing two vinyl radicals, monomers containing two vinylidene radicals, and monomers containing two alkenyl radicals. Particularly advantageous in this context are the diesters of dihydric alcohols with α,μ-monoethylenically unsaturated monocarboxylic acids, among which acrylic acid and methacrylic acid are preferred. Examples of monomers of this kind containing two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the $C_{1-8}$ hydroxyalkyl esters of acrylic and methacrylic acid, such as n-hydroxyethyl, n-hydroxypropyl or n-hydroxybutyl acrylate and methacrylate, and also compounds such as diacetoneacrylamide and acetylacetoxyethyl acrylate and methacrylate, ureidoethyl methacrylate, and acrylamidoglycolic acid. If appropriate it is also possible to copolymerize ethylenically unsaturated monomers which are derivatives of benzophenone or of acetophenone and which, under the action of electromagnetic radiation, increase the internal strength of films formed from aqueous polymer dispersions. Based on the total amount of the monomers to be polymerized, the aforementioned monomers that increase the internal strength are copolymerized usually in an amount of up to 10% by weight, preferably up to 5% by weight.

The films formed from the resulting aqueous polymer dispersions generally feature a reduced soiling tendency.

As further effect monomers it is possible to copolymerize, for example, based on the total amount of the monomers to be polymerized, up to 5% by weight, preferably up to 2% by weight, of ethylenically unsaturated organotin compounds of the kind described in DE-A 39 01 073. The resulting films are biocidal and exhibit, for example, reduced algal infestation.

Beneficial monomer compositions for the preparation of polymers P of the invention generally comprise, in addition to 0.5% to 5% by weight of monomers of the general formula I and II, 70% to 99.5% by weight of esters of acrylic and/or methacrylic acid with alkanols containing 1 to 12 C atoms and/or styrene or 70% to 99.5% by weight of styrene and/or butadiene, or 70% to 99.5% by weight of vinyl chloride and/or vinylidene chloride, or 40% to 99.5% by weight of vinyl acetate, vinyl propionate and/or ethylene.

Particularly relevant with a view to the process of the invention for preparing polymers P are monomer compositions which comprise:

90% to 99.5% by weight of esters of acrylic and/or methacrylic acid with alkanols containing 1 to 12 C atoms and/or styrene, 0.1% to 5% by weight of at least one polar monomer having a water solubility of greater than 50 g/liter (measured at 20° C.).

Likewise relevant are polymers P comprising the following monomer composition:

90% to 99.5% by weight of esters of acrylic and/or methacrylic acid with alkanols containing 1 to 12 C atoms and/or styrene, 0.1% to 5% by weight of at least one monomer of the general formula I and/or II, and 0% to 5% by weight of one or more monomers from the group comprising α,β-monoethylenically unsaturated carboxylic acids containing 3 to 6 C atoms, their alkali metal salts, their ammonium salt, and their amide.

Particularly relevant with a view to the process of the invention for preparing polymers P are monomer compositions which comprise:

90% to 99.5% by weight of esters of acrylic and/or methacrylic acid with alkanols containing 1 to 12 C atoms and/or styrene, 0.1% to 5% by weight of at least one monomer of the general formula I and/or II, and 0% to 5% by weight of one or more monomers from the group comprising α,β-monoethylenically unsaturated carboxylic acids containing 3 to 6 C atoms, their alkali metal salts, their ammonium salt, and their amide;

or

90% to 99.5% by weight of styrene and/or butadiene, 0.1% to 5% by weight of at least one monomer of the general formula I and/or II, and 0% to 5% by weight of one or more monomers from the group comprising α,β-monoethylenically unsaturated carboxylic acids containing 3 to 6 C atoms, their alkali metal salts, their ammonium salt, and their amide;

or

90% to 99.5% by weight of vinyl chloride and/or vinylidene chloride, 0.1% to 5% by weight of at least one monomer of the general formula I and/or II, and 0% to 5% by weight of one or more monomers from the group comprising α,β-monoethylenically unsaturated carboxylic acids containing 3 to 6 C atoms, their alkali metal salts, their ammonium salt, and their amide;

or

90% to 99.5% by weight of vinyl acetate, vinyl propionate and/or ethylene, 0.1% to 5% by weight of at least one monomer of the general formula I and/or II, and 0% to 5% by weight of one or more monomers from the group comprising α,β-monoethylenically unsaturated carboxylic acids containing 3 to 6 C atoms, their alkali metal salts, their ammonium salt, and their amide.

A further beneficial monomer composition suitable for the polymer P is a monomer composition which comprises 90% to 99.5% by weight of at least one monomer from the group comprising esters of acrylic acid with alkanols containing 1 to 8 C atoms, esters of methacrylic acid with alkanols containing 1 to 8 C atoms, styrene, α-methylstyrene, o-chlorostyrene, and vinyltoluenes, 0.1% to 5% by weight of at least one monomer of the general formula I and/or II and 0% to 5% by weight of one or more monomers from the group comprising acrylic acid, methacrylic acid, itaconic acid, the alkali metal salts of these acids, the ammonium salts of these acids, acrylamide, and methacrylamide.

Of these monomer compositions, preference is given to those which comprise no vinylaromatic monomers.

According to Ullmanns Encyclopädie der technischen Chemie, vol. 19, 4$^{th}$ edition, Verlag Chemie, Weinheim (1980) pp. 17/18, an aqueous polymer dispersion only properly forms a polymer film when its minimum film-forming temperature is below the application temperature. The minimum film-forming temperature of an aqueous polymer dispersion can be influenced, in a way which is known per se to the skilled worker, for example, by admixing said aqueous polymer dispersion with what are called external plasticizers of low volatility, such as esters of phthalic acid, for example, and/or volatile film-forming assistants, such as low-boiling organic solvents, with a combination of external plasticizers of low solubility in water at 25° C. and film-forming assistants of high solubility in water at 25° C. proving particularly advantageous for film formation. Suitable relatively volatile film-forming assistants include the following: ethylene glycol, 1,2-propanediol, glycerol and other aliphatic polyalcohols, ethylene glycol monoethyl ether, ethylene glycol monobutyl ether, ethylene glycol hexyl ether, diethylene glycol monomethyl ether, diethylene glycol monopropyl ether, diethylene glycol monobutyl ether, dipropylene glycol methyl ether, dipropylene glycol n-butyl ether, propylene glycol tert-butyl ether, tripropylene glycol methyl ether, and other aliphatic glycol ethers, ethylene glycol monoethyl ether acetate, diethylene glycol monobutyl ether acetate, propylene glycol monomethyl ether acetate, and other esters of aliphatic glycol ethers, diisobutyl adipate, diisobutyl succinate, diisobutyl glutarate, diisobutyl maleate, and other diesters of aliphatic dicarboxylic acids, and white spirit.

Suitable external plasticizers of low volatility include the following: dimethyl phthalate, dibutyl phthalate, dioctyl phthalate and other esters of phthalic acid, 2,2,2-trimethyl-1, 3-pentanediol monoisobutyrate, propoxylated m-cresol having a number-average degree of propoxylation of 6, propoxylated p-cresol having a number-average degree of propoxylation of 6, and also mixtures of these two oligo (propylene glycol) cresol ethers, oligo(propylene glycol) cresol ethers having a number-average degree of propoxylation of 3, oligo(propylene glycol) cresol ethers having a number-average degree of propoxylation of 12, and also oligo (propylene glycol) phenyl ethers and oligo(propylene glycol) alkylphenyl ethers having a number-average degree of propoxylation of 3 to 12, aromatic glycol ethers, ethyl p-toluenesulfonate, alkyl esters of aromatic sulfonic acids, tributoxyethyl phosphate, tri-n-butyl phosphate, and other phosphoric esters.

It will be appreciated that the transition from film-forming assistants to external plasticizers is a fluid one.

Preferably, however, the principle of internal plasticization is employed (and, as will be appreciated, can also be employed in combination with external plasticization). In other words, within the pattern of possible monomer compositions set out above, the monomer composition is selected such that the static glass transition temperature of the polymer P corresponds substantially to the requisite minimum film-forming temperature. This static glass transition temperature, Tg, is the midpoint temperature according to ASTM D 3418-82, determined by differential thermoanalysis DSC (cf. also Ullmann's Encyclopedia of Industrial Chemistry, VCH Weinheim (1992), p. 169, and Zosel, Farbe and Lack 82 (1976), pp. 125-134).

According to Fox (T. G. Fox, Bull. Am. Phys. Soc. (Ser. II) 1, 123[1956]) and according to Ullmanns Encyclopädie der technischen Chemie, vol. 19, 4$^{th}$ edition, Verlag Chemie, Weinheim (1980), p. 18, the static glass transition temperature of copolymers with no more than slight degrees of crosslinking is given in good approximation by the following equation:

$$\frac{1}{T_g} = \frac{X^1}{T_g^1} + \frac{X^2}{T_g^2} + \ldots \frac{X^n}{T_g^n}$$

where $X^1, X^2, \ldots, X^n$ are the mass fractions of the monomers $1, 2, \ldots, n$, and $Tg^1, Tg^2, \ldots Tg^n$ are the static glass transition temperatures of the polymers composed in each case only of one of the monomers $1, 2, \ldots, n$, in degrees Kelvin. The static glass transition temperatures of these homopolymers of the majority of ethylenically unsaturated monomers are known (or can be determined experimentally in a simple way which is known per se) and are listed, for example, in J. Brandrup, E. H. Immergut, Polymer Handbook 1$^{st}$ Ed., J. Wiley, New York 1966, 2$^{nd}$ Ed., J. Wiley, New York 1975, and 3$^{rd}$ Ed., J. Wiley, New York, 1989, and also in Ullmann's Encyclopedia of Industrial Chemistry, VCH Weinheim (1992), p. 169. By way of the static glass transition temperature it is also possible, in a way which is known per se to the skilled worker, to influence the freeze/thaw resistance of the preservative coatings of the invention.

The static glass transition temperature of the films formed from the aqueous dispersions of the polymers P for use in accordance with the invention is preferably −10 to +60° C., more preferably −5 to +40° C., and very preferably 0 to 30° C. Correspondingly, the monomer composition of the polymer P for use in accordance with the invention advantageously comprises 40% to 60% by weight of methyl methacrylate, 40% to 60% by weight of n-butyl acrylate and/or 2-ethylhexyl acrylate (monomers b), 0.2% to 5% by weight of at least one monomer of the general formula I, and 0.2% to 5% by weight of at least one monomer II from the group comprising acrylic acid, methacrylic acid, itaconic acid, the alkali metal salts of these acids, the ammonium salts of these acids, acrylamide, and methacrylamide.

The preparation of the polymer P from the monomers containing at least one monoethylenically unsaturated group takes place advantageously by the method of free-radical aqueous emulsion polymerization, i.e., generally in the presence of free-radical polymerization initiators, and also of dispersants, directly in disperse distribution in the aqueous medium (although the aqueous dispersion of the polymer P intended for concomitant use in accordance with the invention may also be a secondary dispersion; the preparation of secondary dispersions is described, for example, by EP-A 320 865).

This mode of preparation has been described on many occasions before and is therefore sufficiently well known to the skilled worker (cf., e.g., Encyclopedia of Polymer Science and Engineering, Vol. 8, p. 659 ff (1987); D. C. Blackley, in High Polymer Latices, Vol. 1, p. 35 ff (1966); H. Warson, The Applications of Synthetic Resin Emulsions, page 246 ff, chapter 5 (1972); D. Diederich, Chemie in unserer Zeit 24, pp. 135 to 142 (1990); Emulsion Polymerization, Interscience Publishers, New York (1965); DE-A 40 03 422, and Dispersionen synthetischer Hochpolymerer, F. Hölscher, Springer-Verlag, Berlin (1969)).

The size of the polymer particles dispersed in the aqueous polymer dispersion, i.e. their diameter, is determined, in a manner known per se to the skilled worker, more particularly by the nature and amount of dispersant used. Generally speaking, an increasing amount of dispersant is accompanied by a decrease in polymer particle diameter. The diameters of the dispersed polymer particles are typically located in the range from 10 to 5000 nm, often primarily in the range from 10 to 1000 nm.

With advantage the number-average diameter of the aqueous polymer dispersion to be used as part of the process of the invention is 50 to 400 nm, preferably 80 to 300 nm, and more preferably 100 to 250 nm.

To reduce the viscosity of a polymer dispersion it is advantageous if the frequency distribution of the polymer particle diameter is multimodal, i.e., exhibits more than one maximum. The number of maxima is preferably 2, 3 or 4 (determined by means of capillary hydrodynamic fractionation (CHDF) in accordance with J. of Colloid and Interface Science, Vol. 135, pp. 165-177 (1990)).

Suitable dispersants include not only the protective colloids that are typically used for carrying out free-radical aqueous emulsion polymerizations, but also emulsifiers.

Examples of suitable protective colloids include polyvinyl alcohols, cellulose derivatives or vinylpyrrolidone copolymers. A comprehensive description of further suitable protective colloids is given in Houben-Weyl, Methoden der organischen Chemie, volume XIV/1, Makromolekulare Stoffe [Macromolecular compounds], Georg-Thieme-Verlag, Stuttgart, 1961, pp. 411 to 420. It will be appreciated that mixtures of emulsifiers and/or protective colloids can also be used. As dispersants it is preferred to use exclusively emulsifiers, whose relative molecular weights, unlike those of the protective colloids, are typically below 2000, often below 1000. They may be anionic, cationic or nonionic in nature. Where mixtures of surface-active substances are used, the individual components must, it will be appreciated, be compatible with one another, something which in case of doubt can be ascertained by means of a few preliminary tests. Generally speaking, anionic emulsifiers are compatible with one another and with nonionic emulsifiers. The same applies to cationic emulsifiers as well, whereas anionic and cationic emulsifiers are usually incompatible with one another. Examples of commonplace emulsifiers are ethoxylated monoalkylphenols, dialkylphenols, and trialkylphenols (EO degree: 3 to 100, alkyl radical: $C_4$ to $C_{12}$), ethoxylated alcohols (ED degree: 3 to 100, alkyl radical: $C_8$ to $C_{18}$), and also alkali metal salts and ammonium salts of alkyl sulfates (alkyl radical: $C_8$ to $C_{18}$), of sulfuric monoesters or simple phosphoric esters with ethoxylated alcohols (EO degree: 1 to 70, alkyl radical: $C_{12}$ to $C_{18}$) and with ethoxylated alkylphenols (EO degree: 3 to 100, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers such as sulfosuccinic esters are found in Houben-Weyl, Methoden der organischen Chemie, volume XIV/1, Makromolekulare Stoffe, Georg-Thieme-Verlag, Stuttgart, 1961, pages 192 to 208.

Compounds which have proven suitable as surface-active substances are, furthermore, compounds of the general formula II

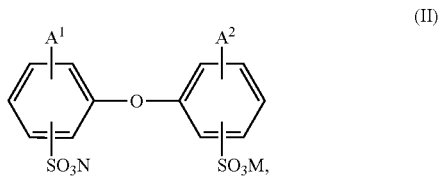

(II)

in which $A^1$ and $A^2$ are hydrogen or $C_4$ to $C_{24}$ alkyl and are not simultaneously hydrogen, and N and M can be alkali metal ions and/or ammonium ions. In the formula II, $A^1$ and $A^2$ are preferably linear or branched alkyl radicals having 6 to 18 C atoms or hydrogen, and more particularly having 6, 12, and 16 C atoms, and $A^1$ and $A^2$ are not both simultaneously hydrogen. N and M are preferably sodium, potassium or ammonium ions, particular preference being given to sodium. Particularly advantageous compounds II are those in which N and M are sodium, $A^1$ is a branched alkyl radical having 12 C atoms, and $A^2$ is hydrogen or $A^1$. Often technical mixtures are used which contain a proportion of 50 to 90% by weight of the monoalkylated product, examples being Dowfax® 2A1 (trade mark of the Dow Chemical Company), Dowfax® 3B2, and Dowfax® 8390. In the process of the invention, the compounds II are preferably used per se and more preferably in a mixture with ethoxylated fatty alcohols and/or oxo process alcohols (EO degree: 3 to 50, alkyl radical: $C_8$ to $C_{36}$) as dispersants. The compounds II are common knowledge, from U.S. Pat. No. 4,269,749, for example, and are available commercially.

Besides the stated anionic emulsifiers it is also possible to use nonionic emulsifiers. Suitable nonionic emulsifiers are araliphatic or aliphatic nonionic emulsifiers, examples being ethoxylated monoalkylphenols, dialkylphenols, and trialkylphenols (EO degree: 3 to 50, alkyl radical: C4-C9), ethoxylates of long-chain alcohols (EO degree: 3 to 50, alkyl radical: C8-C36), and also polyethylene oxide/polypropylene oxide block copolymers. Preference is given to ethoxylates of long-chain alkanols (alkyl radical: C10-C22, average degree of ethoxylation: 3 to 50) and, of these, particular preference to those based on oxo process alcohols and natural alcohols having a linear or branched C12-C18 alkyl radical and a degree of ethoxylation of 8 to 50. It is preferred to use anionic emulsifiers, more particularly emulsifiers of the general formula I, or combinations of at least one anionic and one nonionic emulsifier.

The molecular weight of the polymers can be adjusted by the addition of small amounts, generally up to 2% by weight, based on the monomers to be polymerized, of one or more molecular weight regulator substances, examples being organic thio compounds, silanes, allyl alcohols or aldehydes.

As well as the seed-free mode of preparation, a defined polymer particle size can be set by performing the emulsion polymerization by the seed latex process or in the presence of seed latex prepared in situ.

Processes to this end are known and can be found in the prior art (see EP-B 40419 and also 'Encyclopedia of Polymer Science and Technology', Vol. 5, John Wiley & Sons Inc., New York 1966, p. 847).

In one embodiment of the present invention the polymerization is carried out in the presence of 0.01% to 3% by weight and more particularly 0.05% to 1.5% by weight of a seed latex (solids content of the seed latex, based on total monomer amount), preferably with initial-charge seed latex (initial-charge seed). The latex generally has a weight-average particle size of 10 to 400 nm, preferably 20 to 120 nm, and more particularly 20 to 50 nm. Its constituent monomers are, for example, styrene, methyl methacrylate, n-butyl acrylate, and mixtures thereof, it being possible for the seed latex also to comprise, to a minor extent and in copolymerized form, monomers such as, for example, acrylic acid and/or methacrylic acid and/or their amides, preferably at less than 10% by weight, based on the total weight of the polymer particles in the seed latex.

Polymerization pressure and polymerization temperature are of relatively minor importance. In general the polymerization is operated at temperatures between room temperature and 120° C., preferably at temperatures from 40 to 110° C., more preferably between 50 and 100° C. The application of increased or reduced pressure is possible, and so the polymerization temperature may also exceed 100° C. and may be up to 130° C. Volatile monomers such as ethylene, butadiene or vinyl chloride are preferably polymerized under increased pressure.

Following the polymerization reaction proper it is necessary if appropriate largely to free the aqueous polymer dispersions of the invention from odorants, such as residual monomers and other volatile organic constituents. This can be achieved in a known way, physically, by distillative removal (more particularly via steam distillation) or by stripping with an inert gas. The reduction in the level of residual monomers can also be accomplished chemically, by free-radical postpolymerization, more particularly under the action of redox initiator systems, of the kind set out, for example, in DE-A 44 35 423, in DE-A 44 19 518, and in DE-A 44 35 422. The postpolymerization is preferably carried out with a redox initiator system composed of at least one organic peroxide and an organic sulfite.

In this way it is possible to obtain polymer dispersions with polymer contents of up to 80% by weight, based on the total weight of the dispersion. For preparing the formulations employed in accordance with the invention, preference is given on practical grounds to using dispersions having polymer contents in the range from 30% to 70% by weight, more particularly 40% to 65% by weight.

The formulations employed in accordance with the invention may take any desired form—in other words, that of solutions or dispersions of the copolymers P. As the solution or dispersion medium it is preferred to use aqueous solvents, i.e., water or mixtures of water and a water-miscible organic solvent, e.g., a C1-C4 alkanol, such as methanol, ethanol, n-propanol or isopropanol, n-butanol, isobutanol or tert-butanol, glycol, propylene glycol, butylene glycol, glycerol, diethylene glycol, triethylene glycol, tetrahydrofuran or the like.

The copolymers P of the invention are employed preferably in the form of aqueous formulations comprising not more than 50%, more particularly not more than 20%, and especially not more than 10% by weight, based on the total weight of the formulation, of water-miscible solvents. With very particular preference the formulations of the invention comprise no organic solvents besides water, aside from typical frost preventatives and film-forming assistants. Within these formulations the copolymers P are generally in the form of aqueous dispersions.

In accordance with the invention the solutions or dispersions of the copolymers P can be used as they are. The formulations, though, generally comprise 0.1% to 30% by weight of typical assistants. Where the copolymers P have been prepared by free-radical aqueous emulsion polymerization, the aqueous formulations further comprise the surface-active substances that are used for that purpose, such as emulsifiers and/or protective colloids.

Examples of typical assistants are wetting agents, fungicides, defoamers, thickeners, antifreeze agents, flow promoters, plasticizers, and film-forming assistants. Examples of suitable film-forming assistants are ethylene glycol, propylene glycol, butylene glycol, hexylene glycol, diethylene glycol, dipropylene glycol, dibutylene glycol, their monoethers with C1-C4 alkanols, e.g., diethylene glycol monoethyl and monobutyl ether, propylene glycol monophenyl, monopropyl, and monobutyl ether, dipropylene glycol monopropyl and monobutyl ether, their ether acetates, such as diethylene glycol monoethyl and monobutyl ether acetate, propylene glycol monopropyl and monobutyl ether acetate, dipropylene glycol n-butyl ether acetate, and also alkyl esters of aliphatic monocarboxylic and dicarboxylic acids, e.g., Texanol® from Eastman Kodak, or their technical mixtures, e.g., Lusolvan® FBH from BASF AG (di-n-butyl ester mixtures of succinic, glutaric, and adipic acid). Suitable plasticizers are all typical plasticizers suitable for dispersions, examples being oligo (propylene glycol) alkylphenyl ethers, of the kind available commercially, for example, as Plastilit® 3060 from BASF AG.

The aqueous formulations employed in accordance with the invention may also, furthermore, comprise inorganic fillers and/or pigments. Typical pigments are, for example, titanium dioxide, preferably in the rutile form, barium sulfate, zinc oxide or lithopones (zinc sulfide+barium sulfate). For decorative purposes the formulations may also comprise colored pigments, examples being iron oxides, carbon black, graphite, zinc yellow, zinc green, ultramarine, manganese black, antimony black, manganese violet, Paris blue or Schweinfurt green. Suitable fillers comprise aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc.

The aqueous formulations employed in accordance with the invention may also, furthermore, comprise crosslinking additions. Possible such additions include the following: aromatic ketones, e.g., alkyl phenyl ketones, which if appropriate have one or more substituents on the phenyl ring, or benzophenone and substituted benzophenones as photoinitiators. Photoinitiators suitable for this purpose are known, for example, from DE-A 38 27 975 and EP-A 417 568. Suitable compounds with a crosslinking action are also water-soluble compounds having at least two amino groups, examples being dihydrazides of aliphatic dicarboxylic acids in accordance with DE-A 39 01 073, if the copolymer P comprises, in copolymerized form, monomers comprising carbonyl groups.

The coating materials of the invention comprehend, for example, clearcoat (transparent varnish) materials, surface coatings such as paints, renders or coating systems.

One preferred embodiment of the present invention uses the aqueous formulations in the form of a clearcoat material. In that case they generally comprise, based on their total weight, 10% to 60%, preferably 40% to 55%, by weight of at least one copolymer P and 0.1% to 30%, preferably 0.5% to 10%, by weight of typical assistants, more particularly defoamers and/or film-forming assistants.

Another embodiment of the present invention uses the aqueous formulations in the form of pigmented and/or filled formulations. In this case the total amount of copolymer P in the aqueous formulation is in the range from 10% to 60%, preferably in the range from 20% to 40%, by weight; the assistants content is in the range from 0.1% to 30% and preferably in the range from 0.5% to 10% by weight, and the content of fillers and/or pigments is in the range from 10% to 60% by weight and more particularly from 15% to 40% by weight. The amount of pigments and/or fillers is generally between 50 and 450 parts by weight per 100 parts by weight of copolymer P in the aqueous formulation. Furthermore, besides the film-forming assistants and the defoamers, pigmented formulations will preferably also comprise a dispersant and/or wetting agent.

The clearcoat materials and pigmented paints of the invention may comprise further typical assistants, such as wetting agents, in-can and in-film preservatives, thickeners, defoamers, flow promoters, and antifreeze agents, for example, in the amounts that are typical per se.

In general the amount of dispersant used is 0.5% to 6%, preferably 1% to 3%, by weight, based on the amount of monomers for free-radical polymerization.

Suitable free-radical polymerization initiators include all those which are capable of triggering a free-radical aqueous emulsion polymerization. They may be peroxides, such as alkali metal peroxodisulfates, or azo compounds. Frequently use is made of combined systems, which are composed of at least one organic reducing agent and at least one peroxide and/or hydroperoxide, examples being tert-butyl hydroperoxide and the sodium salt of hydroxymethanesulfinic acid, or hydrogen peroxide and ascorbic acid, and, in many cases, combined systems, which further comprise a small amount of a metal compound which is soluble in the polymerization medium and whose metallic component is able to occur in a plurality of valence states, an example being ascorbic acid/iron(II) sulfate/hydrogen peroxide, in which the ascorbic acid is also frequently replaced by the sodium salt of hydroxymethanesulfinic acid, sodium sulfite, sodium hydrogen sulfite or sodium disulfite, and the hydrogen peroxide by tert-butyl hydroperoxide or alkali metal peroxydisulfates and/or ammonium peroxydisulfate. In place of a water-soluble iron(II) salt use is frequently made of a combination of water-soluble Fe/V salts. The amount of free-radical initiator systems used, based on the total amount of the monomers to be polymerized, is preferably 0.1% to 2% by weight.

In order to influence the molecular weight it will be appreciated that it is possible as well to use molecular weight regulator compounds such as mercaptans, e.g., mercaptoethanol, or thioglycolic esters, in the context of the polymerization.

The polymerization medium may be composed either of water alone or of mixtures of water and water-miscible liquids such as methanol. Preference is given to using just water.

The gradient regime for the purposes of the present invention is an emulsion polymerization in which one or more monomers are metered in at a nonconstant rate. For reasons of ease of apparatus handling, in the case of the experiments described here, the rates were varied not continuously (i.e., true gradient) but rather in stages (i.e., interpolated gradient) (in the mathematical sense, therefore, the plot of the metering rate against time represents a noncontinuous function). Continuous rate changes, however, are in principle also operable without substantial extra effort or complexity.

The free-radical aqueous emulsion polymerization for the preparation of the polymers P is preferably carried out by the feed process; in other words, the predominant portion of the monomers is supplied continuously to the polymerization vessel in accordance with the polymerization conversion that has taken place. The feed of the monomers in this case takes place preferably in the form of an emulsion feed. In other words, an aqueous emulsion is formed from the entirety of the monomers to be polymerized, from a portion of the water, and from a portion of the emulsifiers that are to be used as an accompaniment, and this aqueous emulsion is supplied continuously to the polymerization vessel in accordance with the consumption of monomer (emulsion feed process).

Additionally, in parallel with this, it is possible to use a second feed vessel. The second feed vessel may comprise a portion of the monomers used for the emulsion polymerization, in emulsified form, in pure form or in dissolved form. If an emulsion is used in this second feed vessel, it is possible, if appropriate, to use emulsifiers therein. Suitable emulsifiers and/or solvents correspond to those of the first feed. It is preferred to use water. The second feed preferably comprises at least one hydrophilic monomer in emulsified, dissolved or pure form. With particular preference it comprises at least one hydrophilic monomer in dissolved form.

The contents of the second feed vessel may be supplied to the reactor vessel independently of the first. This allows the constituents present in the second feed to be metered at different rates relative to the first feed. In principle the metering rate of both feeds, for any point in time during the polymerization, can be selected freely and independently of the other. This also implies interrupted feeds. The contents of the first feed are preferably supplied to the reactor vessel linearly, i.e., at a constant metering rate, over the selected polymerization time. The contents of the second feed are preferably supplied to the reactor nonlinearly, i.e., at a nonconstant metering rate, over the course of the selected polymerization time. This implies any conceivable metering rate profile, including feed interruptions, true feed gradients (i.e., continual change in the metering rate), staged gradients (i.e., stepwise changing of the metering rate), transfer of metering into defined time ranges of the polymerization, etc. As an alternative to the second separate feed it is also possible to realize true gradients with techniques such as power feeding. For that purpose the constituents which are to be metered at a nonconstant rate are metered into the actual feed at a constant or variable rate, while at the same time this actual feed is metered into the reaction event at a constant or variable rate. As a result of this arrangement, the composition of the feed changes as a function of time, corresponding to the metering of the desired constituents at a nonconstant rate. Defined metering profiles, such as interruptions, for example, are not possible, however, with this arrangement of apparatus. For the purposes of the invention, therefore, on grounds of flexibility, preference is given to the process with a separate, and separately controllable, second feed.

The manner in which the free-radical initiator system is added to the polymerization vessel in the course of the free-radical aqueous emulsion polymerization of the invention is of relatively minor importance to the success of the process of the invention. The initiator system may either be included completely in the initial charge to the polymerization vessel, or else added continuously or in stages at the rate at which it is consumed in the course of the free-radical aqueous emulsion polymerization. In each individual case this will depend, as a person of ordinary skill in the art is aware, both on the chemical nature of the initiator system and on the polymerization temperature.

The emulsion feed process is preferably carried out as follows. The polymerization vessel is charged with 10% to 50% by weight of the total amount of water to be used and with 0% to 50% by weight of the total amount of dispersant to be used, and this initial charge is heated to the desired polymerization temperature. It is also possible to include a portion of the monomers in the initial charge. A monomer emulsion, forming a feed 1, is produced from the entirety of the monomers to be polymerized with a rate profile A, from the remainder of the dispersant, and from 10% to 50% by weight of the total amount of water to be used. The total amount of polymerization initiator to be used is dissolved in 1% to 20% by weight of the total amount of water to be used. This solution forms a feed 2. Additionally, the monomers that are to be metered with a rate profile B, which is independent of the rate profile A, form a separate feed 3, in pure, dissolved or aqueously emulsified form. Subsequently the initial charge, heated to the polymerization temperature, is admixed with 1% to 10% by weight of feed 1 and/or 1% to 10% by weight of feed 3 and also with 1% to 10% by weight of feed 2, and the resulting mixture is polymerized to a conversion of the monomers present of at least 80 mol %, preferably at least 90 mol %. Subsequently, with the polymerization maintained, the remainders of feeds 1, 2, and 3 are supplied (at the rate of the polymerization conversion) in spatial separation. Feeds 1 and 2 are preferably metered in continuously, i.e., at a constant metering rate, whereas the metering of feed 3 takes place at a nonconstant rate. Subsequently, if appropriate, postpolymerization is carried out in order to complete the polymerization conversion.

With very particular preference the emulsion polymerization process is carried out such that the initial charge additionally comprises at least a portion of the total amount of the monomers to be copolymerized overall, of the general formula I and/or II, and only the remainder of the total amount of the monomers of the general formula I and/or II participates in the emulsion feed 1 and/or in the separate feed 3.

With advantage, this amount of monomers of the general formula I included in the initial charge is 5% to 100%, preferably 20% to 90%, and more preferably 40% to 80%, by weight of the total amount of the monomers of the general formula I that are to be copolymerized in total. The aqueous polymer dispersions for use in accordance with the invention that result in the context of this procedure are distinguished by increased stability of the disperse distribution of the polymer particles.

Furthermore, it is possible to exert a controlled influence within a wide framework and in a simple way over the flow resistance of the resulting aqueous polymer dispersion, by way of the amount copolymerized and also by way of the distribution of the monomers of the general formula I between initial charge and feed (a low volume fraction in the initial charge implies a relatively low flow resistance; an increased volume fraction in the initial charge, correspondingly, implies an increased flow resistance). For a solids content of 50% by volume in the resulting aqueous polymer dispersion, for example, it is possible in a controlled way to set dynamic viscosities of 20 to 1000 mPas (measured at a shear rate of 250 sec$^{-1}$, and at 25° C. and 1 atm in accordance with DIN 53019).

A preferred polymerization initiator in the case of the feed process is sodium peroxodisulfate, and the polymerization temperature is preferably 75 to 95° C. In general the polymerization takes place under an inert gas atmosphere.

Using the method of free-radical aqueous emulsion polymerization, the polymer P of the invention is preferably prepared at a pH of the aqueous dispersion medium of between 1.5 and 9. Subsequently, at or after the end of the polymerization, the addition of alkali metal hydroxide and/or ammonia sets a pH of 6 to 10, preferably of 7 to 9, in the aqueous dispersion medium. Typically, the resultantly increased pH of the aqueous dispersion medium results in an improved storage stability on the part of the aqueous polymer dispersion, and is particularly suitable for the inventive preservation. The solids content of the aqueous polymer dispersions for use in the context of the method of the invention is typically 20% to 70% by weight, preferably between 40% and 60% by weight.

For the various applications according to the invention, the following method variants and method parameters are preferred:

Bitumen Coatings
Beneficial metering profile: falling gradients, i.e., with metering rate decreasing over the course of the polymerization
Preferred binder solids content: 40%-50%
Preferred pH: 6.5-8
Preferred particle size: 70-150 nm (HPPS)
Preferred binder glass transition temperature: 10 to 30° C.
Binders for Colored Stone Renders
Beneficial metering profile: ascending gradients, i.e., with metering rate increasing over the course of the polymerization
Preferred binder solids content: 45%-55%
Preferred pH: 6.5-8
Preferred particle size: 80-200 nm (HPPS)
Preferred binder glass transition temperature: 0 to 25° C.

The aqueous dispersion of the polymer P, in the context of the method of the invention, can be used either as it is, or else with additions, for the purpose of preserving a shaped mineral article. Possible such additions include the following: an aromatic ketone such as benzophenone in accordance with DE-A 38 27 975 as a photoinitiator for the purpose of crosslinking on exposure to electromagnetic radiation, or a water-soluble dihydrazide, in accordance with DE-A 39 01 073, if the polymer P comprises, in copolymerized form, monomers containing carbonyl groups.

With particular frequency the aqueous dispersion of the polymer P is used for preservation in pigmented form. Examples of typical pigments are titanium dioxide, preferably in the rutile form, barium sulfate, zinc oxide or lithopones (zinc sulfide+barium sulfate). For decorative purposes the formulations may also comprise colored pigments, examples being iron oxides, carbon black, graphite, zinc yellow, zinc green, ultramarine, manganese black, antimony black, manganese violet, Paris blue or Schweinfurt green.

Suitability as pigments is possessed, furthermore, (though frequently also referred to as fillers) by, for example, barium sulfate, talc, mica, calcium carbonate, dolomite, finely ground quartz, and mixtures thereof. Pigments can be added to the aqueous dispersion of the polymer P until a short way below the critical pigment volume concentration. Their volume fraction, based on the total composition for use in accordance with the invention, is preferably 15% to 45% by volume. The aqueous dispersion of the polymer P for the method of the invention may further comprise other assistants, such as wetting agents, fungicides, defoamers, thickeners, antifreeze agents, and flow promoters, for example, which are added in the amounts that are typical per se.

The application rate of the aqueous polymer formulation to be applied for preservation is typically 100 to 700 g/m² (calculated wet). Application may take place in a conventional manner, by spraying, troweling, knife coating, rolling or pouring. It is important that the method of the invention can be employed with both ready-cured and freshly prepared ("green") shaped mineral articles. It is especially suitable for preserving shaped mineral articles comprising cement as a mineral binder (cast concrete). In a particularly advantageous way it prevents efflorescence on concrete roof tiles. The latter are produced from cement mortars whose consistency permits ultimate shaping. They are generally hardened at temperatures between 40 and 80° C. After shaping (by extrusion, for example) but generally prior to hardening, the concrete roof tiles are coated superficially with an aqueous composition for use in accordance with the invention, and then stored for 6 to 12 h in curing chambers, in which typically the abovementioned temperatures prevail. Within this time they cure, and at the same time the coating composition forms a preserving film. In some cases a further application is performed with coating composition, after the curing operation, with subsequent drying.

EXAMPLES

Comparative Examples

Comparative Example 1

A polymerization vessel was charged with 400 g of deionized water, 1.4 g of itaconic acid, and 6.22 g of emulsifier solution 1, and this initial charge was heated to 85° C. In a feed vessel 1 an emulsion was prepared from

| | |
|---|---|
| 158 g | deionized water |
| 9 g | emulsifier solution 1 |
| 37 g | emulsifier solution 2 |
| 413 g | methyl methacrylate |
| 287 g | n-butyl acrylate |
| 70 g | 20% strength by weight solution of IA |
| 7 g | 50% strength by weight solution of acrylamide in water |

In a second feed vessel, vessel 2, a solution was prepared of 1.4 g of sodium peroxodisulfate in 75 g of water. Thereafter, retaining the 85° C., in succession, in one portion, 49 g of feed 1 and 7.6 g of feed 2 were added to the initial charge, and reaction was allowed to take place for 30 min.

Subsequently, beginning at the same time but via spatially separate feeds, the remainders of feed 1, over the course of 3 h, and of feed 2, over the course of 3.5 h, were added to the polymerization vessel, with retention of the 85° C. After the end of feed 2, polymerization was allowed to continue for 1 h, after which the batch was cooled to 25° C. and neutralized with aqueous sodium hydroxide solution (pH=about 8).

The solids content of the dispersions was approximately 49%.

Emulsifier Solution 1:
45% strength by weight aqueous solution of an active substance (mixture of mono- and didodecylbenzylsulfonic acid sodium salt) customary in commerce as Dowfax® 2A1 (Dow Chemical)

Emulsifier Solution 2:
15% strength by weight aqueous solution of the sodium salt of a $C_{12}$ alkyl sulfate Comparative Example 2 as Comparative Example 1 but additionally in feed 1

| | |
|---|---|
| 7.5 g | 50% strength by weight solution of the sodium salt of 2-acrylamidopropanesulfonic acid |

Comparative Example 3

A polymerization vessel equipped with metering apparatus and temperature regulation was charged with:

| | | |
|---|---|---|
| Initial charge: | 305.1 g | water |
| | 19.7 g | 20% aqueous solution of dodecylbenzyl-sulfonic acid sodium salt |
| | 38.6 g | feed 1 |
| | 16.6 g | feed 2 |
| | 5.9 g | sodium peroxodisulfate (7%) | and this initial charge was heated to 90° C. with stirring (150 rpm). Subsequently, with this temperature maintained, the portions of feed 1, over 2 min, and of feed 2, over 1 min, were added and the mixture was stirred for 15 min. Subsequently feeds 1 and 2 were metered in over 3 h.

| | | |
|---|---|---|
| Feed 1: | 557.7 g | water |
| | 19.7 g | 20% aqueous solution of $C_{16-18}$ fatty alcohol polyethoxylate |
| | 13.1 g | 45% aqueous solution of dodecyldiphenyl ether disulfonic acid sodium salt |
| | 1.2 g | ammonia (25%) |
| | 15 g | acrylic acid |
| | 25 g | acrylamide (50%) |
| | 477.7 g | methyl methacrylate |
| | 479.5 g | n-butyl acrylate |
| Feed 2: | 11.0 g | sodium peroxodisulfate (7%) |

Feed 1 was flushed with 21.6 g of water. Stirring was continued for 15 min, and, over 15 min, 3.5 g of ammonia (25%) in 16.7 g of water and also 8.6 g of flush water were added, and the mixture was stirred for 5 min and cooled from 90° C. to 80° C. over the course of 10 min. Over 1 h, 5.9 g of tert-butyl hydroperoxide (10%) and 7.5 g of sodium acetone disulfite (13.1%) were metered in with 2.2 g of water and 10.8 of flush water. After cooling and a reduction in rotational speed, 1.6 g of ammonia (25%) were added.

Inventive Example 1

Like Comparative Example 2 but with metering of the itaconic acid via a separate feed 3, with feeds 1 and 2 being metered in over 3 h and, after 1.5 h, feed 3 being metered in over 1.5 h.

Inventive Example 2 like Inventive Example 1 but with feed 3 metered at a nonconstant rate (ascending metering rate):

| Metering rate [g/h] | Duration [min.] |
|---|---|
| 38.4 | 22 |
| 41.4 | 22 |
| 44.4 | 22 |
| 47.4 | 22 |
| 50.4 | 22 |
| 53.4 | 22 |
| 56.4 | 22 |
| 60.0 | 26 |

Inventive Example 3 like Inventive Example 1 but with feed 3 metered at a nonconstant rate (ascending metering rate):

| Metering rate [g/h] | Duration [min.] |
|---|---|
| 27.6 | 22 |
| 33.6 | 22 |
| 39.6 | 22 |
| 45.6 | 22 |
| 51.6 | 22 |
| 59.4 | 22 |
| 64.2 | 22 |
| 70.8 | 26 |

Inventive Example 4 like Inventive Example 1 but:

| Feed 3: | 181 g | mesaconic acid (4%) |
|---|---|---|

Inventive Example 5

Like Inventive Example 1, but addition of the 50% aqueous solution of 2-acrylamido-2-methylpropanesulfonic acid via a separate feed 3 over the course of 1 h 30 min, beginning simultaneously with feed 1.

Inventive Example 6

Like Inventive Example 1, but
a) 77 g of itaconic acid (20%) in feed 3 and 154 g instead of 158 g of deionized water in feed 1
b) 84 g of itaconic acid (20%) in feed 3 and 150 g instead of 158 g of deionized water in feed 1
c) 91 g of itaconic acid (20%) in feed 3 and 145 g instead of 158 g of deionized water in feed 1
d) 98 g of itaconic acid (20%) in feed 3 and 141 g instead of 158 g of deionized water in feed 1

Inventive Example 7 like Inventive Example 1, but
140 g of itaconic acid (20%) in feed 3 and 116 g instead of 158 g of deionized water in feed 1.

Inventive Example 8 like Inventive Example 1, but in feed 1, instead of 7.5 g the 50% aqueous solution of 2-acrylamido-2-methylpropanesulfonic acid, 15 g of the 50% aqueous solution of 2-acrylamido-2-methylpropanesulfonic acid, and 112 g instead of 158 g of deionized water. Also 140 g of itaconic acid (20%) in feed 3.

Inventive Example 9 like Inventive Example 1, but in feed 1, instead of 10.5 g the 50% aqueous solution of 2-acrylamido-2-methylpropanesulfonic acid, 22.5 g of the 50% aqueous solution of 2-acrylamido-2-methylpropanesulfonic acid, and 110 g instead of 158 g of deionized water. Also 140 g of itaconic acid (20%) in feed 3.

Inventive Example 10 like Inventive Example 1, but:

| Feed 3: | 1.8 g | acrylic acid |
|---|---|---| and also, in feed 1: 169 g instead of 158 g of deionized water.

Inventive Example 11 like Inventive Example 1, but

| Feed 3: | 3.6 g | acrylic acid |
|---|---|---| and also, in feed 1: 179 g instead of 158 g of deionized water.

Inventive Example 12 like Inventive Example 1 but metering of feed 3 after 1 h 45 min over 1 h 15 min, and also

| a) | Feed 3: | 70 g itaconic acid (20%) |
|---|---|---|
| b) | Feed 3: | 52.5 g itaconic acid (20%) |
| | | and, in feed 1: 169 g instead of 158 g of deionized water. |
| c) | Feed 3: | 35 g itaconic acid (20%) |
| | | and, in feed 1: 179 g instead of 158 g of deionized water. |

Inventive Example 13 a) like Inventive Example 1 but with feed 3 metered in after 120 min over 60 min
b) like Inventive Example 1 but with feed 3 metered in after 105 min over 75 min
c) like Inventive Example 1 but with feed 3 metered in after 75 min over 105 min
d) like Inventive Example 1 but with feed 3 metered in after 60 min over 120 min

Inventive Example 14

Like Comparative Example 1, but with metering of the itaconic acid via a separate feed 3, with feeds 1 and 2 metered in over 3 h, and, after 1.5 h, feed 3 metered in over 1.5 h.

Inventive Example 15 like Inventive Example 14 but:
feeds 1, 2, and 3 were commenced simultaneously, and 50% of feed 3 was run in over 45 min. After 2 h 15 min the remaining 50% of feed 3 was run in over 45 min.

Inventive Example 16 like Inventive Example 14 but

| | | |
|---|---|---|
| Feed 3: | 105 g | itaconic acid (50%) |
| | and also, in the feed, 137 g instead of 158 g of deionized water. | |

Inventive Example 17 like Inventive Example 10, but commencement of feed 3 1 h 30 min after commencement of feeds 1 and 2, and also metering of feed 3 over 1 h 30 min.

Inventive Example 18 like Comparative Example 1, but with metering of the itaconic acid via a separate feed 3, with feeds 1, 2, and 3 being commenced simultaneously. Feeds 1 and 2 were metered in over 3 h, while feed 3 was metered in over the course of 1.5 h.

Inventive Example 19 like Inventive Example 1 but with feed 3 metered at a nonconstant rate (falling metering rate):

| Metering rate [g/h] | Duration [min.] |
|---|---|
| 60 | 22 |
| 57 | 22 |
| 54 | 22 |
| 51 | 22 |
| 48 | 22 |
| 45 | 22 |
| 42 | 22 |
| 39 | 26 |

Inventive Example 20 like Inventive Example 1 but with feed 3 metered at a nonconstant rate (falling metering rate):

| Metering rate [g/h] | Duration [min.] |
|---|---|
| 70.8 | 22 |
| 64.8 | 22 |
| 58.8 | 22 |
| 52.8 | 22 |
| 46.8 | 22 |
| 40.8 | 22 |
| 34.8 | 22 |
| 28.2 | 26 |

Inventive Example 21 like Inventive Example 1 but with feed 3 metered at a nonconstant rate (falling metering rate):

| Metering rate [g/h] | Duration [min.] |
|---|---|
| 60 | 22 |
| 57 | 22 |
| 54 | 22 |
| 51 | 22 |
| 48 | 22 |
| 45 | 22 |
| 42 | 22 |
| 39 | 26 |

Inventive Example 22 like Inventive Example 1 but with feed 3 metered at a nonconstant rate (falling metering rate):

| Metering rate [g/h] | Duration [min.] |
|---|---|
| 70.8 | 22 |
| 64.8 | 22 |
| 58.8 | 22 |
| 52.8 | 22 |
| 46.8 | 22 |
| 40.8 | 22 |
| 34.8 | 22 |
| 28.2 | 26 |

Inventive Example 23 like Inventive Example 18, but with metering of feed 3 over 30 min.

Inventive Example 24 like Inventive Example 18, but with 5.2% of feed 3 in the initial charge.

Inventive Example 25 like Inventive Example 18, but:

| | | |
|---|---|---|
| Feed 3: | 52.5 g | itaconic acid (20%) |
| | 1.8 g | acrylic acid |
| | and, in feed 1: 169 g instead of 158 g of deionized water. | |

Example 26 like Inventive Example 18, but:

| | | |
|---|---|---|
| Feed 3: | 105 g | itaconic acid (20%) |
| | and, in feed 1: 137 g instead of 158 g of deionized water. | |

Inventive Example 27 like Comparative Example 3, but with addition of acrylic acid via a separate feed 3 only after 1 h 15 min and metering over a period of 1 h 15 min.

Inventive Example 28 like Comparative Example 3, but with addition of acrylamide via a separate feed 3 only after 1 h 15 min and metering over a period of 1 h 15 min.

Inventive Example 29 like Comparative Example 3, but with addition of acrylic acid and acrylamide via a separate feed 3 only after 1 h 15 min and metering over a period of 1 h 15 min.

Inventive Example 30 like Comparative Example 3, but with addition of acrylic acid via a separate feed 3 within 1 h 15 min, beginning simultaneously with feed 1.

Example 31 like Comparative Example 3, but with addition of acrylamide via a separate feed 3 within 1 h 15 min, beginning simultaneously with feed 1.

Example 32 like Comparative Example 3, but with addition of acrylic acid and acrylamide via a separate feed 3 within 1 h 15 min, beginning simultaneously with feed 1.

Performance testing: wet coating (inspection after 5 days+ 60° C. steam bath)

For the purpose of determining the properties, 100 g of each of the dispersions were admixed with 0.5 g of a defoamer (Tego Foamex® 822 from Th. Goldschmidt AG) and 5 g of a technical mixture of the di-n-butyl esters of succinic, glutaric and adipic acids. The dispersions thus formulated were applied using a spray gun to a "green" slurry roof tile (application approximately 20 g/tile; approximately 320 g/m² wet application (the "green" concrete tile used was a flat tile measuring 30×20×1.8 cm produced by extruding a mortar comprising sand (grain size up to 0.3 mm) and cement (sand/cement weight ratio 4:/1, and water (water/cement weight ratio 1:2.5))). Applied immediately to the green concrete roof tile was a cement slurry, with a thickness of about 1 mm (fine mortar comprising 86 parts of sand (grain size up to 0.3 mm), 4.8 parts of red iron oxide pigment, 74 parts of cement, and also 52 parts of water and 1 part of concrete plasticizer). This was followed by drying at 40° C. and 75% relative humidity for 2 h and then at 40° C. and 95% relative humidity for 5 h. After drying, the tile was placed on its facing side onto a 60° C. waterbath for 5 days.

Immediately after removing the roof tile from the waterbath, the blushing behavior is assessed in the wet state.
1 no blushing
2 a few white dots
3 a few white spots
4 a number of larger white areas
5 white area After drying had taken place, the degree of efflorescence was assessed visually. This was done on the basis of the following rating scale:
0=no efflorescence
1=virtually no efflorescence
2=slight efflorescence
3=moderate efflorescence
4=severe efflorescence
5=very severe effluorescence To determine the color change of coated cast concrete pieces exposed to weathering, "green" cast concrete pieces were coated in the manner described above with the clearcoat materials described. The pieces were then exposed to a 60° C. waterbath for 5 days. After they had dried, a visual assessment was made of the difference in lightness between the weathered and the unweathered points. This was done on the basis of a scale from 0 to 2. The results are summarized in Table 4.
0=no difference
1=slightly perceptible difference
2=distinctly perceptible difference The "visual impression" test describes the quality of the coating in its entirety without prior exposure: the important factor is a uniform, slightly lustrous appearance of the coated roof tile, with no defects.

| Formulation for slurry roof tile coatings | |
|---|---|
| Dispersion | 100 |
| Butyl diglycol/H₂O (1:1) | 20 |
| Methylpropionic acid-2,2,4-trimethyl-1,3-pentane diester | 10 |
| Polyethersiloxane-based defoamer | 2.5 |
| Isothiazolone-based microbiocide | 1 | e exposed u unexposed

TABLE 1

Performance testing on slurried concrete roof tiles

| | Roof tile | | Flat part | |
|---|---|---|---|---|
| | Color difference, dry, between u and e | Blushing | Efflorescence | Visual impression |
| Example | | | | |
| 1 (comp.) | 1 | 3-4 | 0 | moderate |
| 2 (comp.) | 1 | 2-3 | 0-1 | moderate |
| 1 | 0 | 1 | 0-1 | very good |
| 2 | 0 | 3 | 2 | good |
| 3 | 0 | 4 | 1.5 | good |
| 4 | 0-1 | 3 | 1-2 | good |
| 5 | 1 | 3 | 0 | medium |
| 6a | 0-1 | 1-2 | 0 | moderate |
| 6b | 0 | 1-2 | 0 | moderate |
| 6c | 0-1 | 1-2 | 0 | moderate |
| 6d | 0-1 | 1-2 | 0 | moderate |
| 7 | 1 | 3 | */** | moderate |
| 8 | 1-2 | 2 | */** | moderate-poor |
| 9 | 0-1 | 2 | */** | good-moderate |
| 10 | 1 | 2 | 2-3 | moderate |
| 11 | 1 | 2 | 2 | moderate |
| 12a | 1-2 | 1 | * | good-moderate |
| 12b | 1-2 | 1 | 0 | good-moderate |
| 12c | 1-2 | 1 | * | good-moderate |
| 13a | 0-1 | 1 | * | good |
| 13b | 0-1 | 1 | * | good |
| 13c | 0-1 | 1-2 | * | good |
| 13d | 0-1 | 2 | * | good |
| 15 | 0-1 | 4 | 0 | good-moderate |
| 16 | 1 | 4 | 0 | crystals in the film |
| 17 | 0 | 3-4 | 0-1 | moderate |
| 23 | 1 | 5 | 0 | moderate |
| 24 | 1 | 3 | 0 | good-moderate |
| 25 | 0 | 4 | 0-1 | moderate |
| 26 | 0-1 | 5 | 0 | |

\* at holes
\*\* at the edge

Performance Testing on Bitumen Panels: Rain Test (7 Days)
Blushing
Rating Key:
1=no blushing
2=a few white dots
3=a few white spots
4=a number of larger white areas
5=white area

| Example | Blushing* |
|---|---|
| 14 | 5 |
| 15 | 3 |
| 18 | 1 |
| 23 | 4 |
| 24 | 2 |

*after 7-day rain test

Performance Testing in Dispersions for Colored Masonry Renders
Blushing Test Method Using a doctor blade, 250µ films are applied to black polymeric film (Leneta film) which are then placed in a waterbath. The blushing is inspected visually after 2 days.

Rating Key:
1=no blushing
2=a few white dots
3=a few white spots
4=a number of larger white areas
5=white area

| Example | Blushing |
|---|---|
| 3 (comp.) | 3-4 |
| 27 | 3-4 |
| 28 | 4 |
| 29 | 5 |
| 30 | 2 |
| 31 | 3 |
| 32 | 0 |

The invention claimed is:

1. An aqueous polymer dispersion, comprising:
a dispersed addition polymer P comprising, copolymerized in free-radical polymerized form, at least one polar monomer having a water solubility of greater than 50 g/liter, measured at 20° C.,
wherein the dispersed addition polymer P is obtained by free-radical initiated aqueous emulsion polymerization of a reaction mixture comprising:
(A) at least one monomer selected from the group consisting of an ethylenically unsaturated acid and a conjugated base of an ethylenically unsaturated acid;
(B) at least one monomer of formula (I)

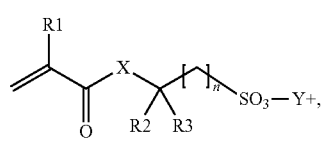
(I)

wherein
n is 0 to 2,
R1, R2, and R3 are, independently of one another, hydrogen or a methyl group,
X is O or NH, and
Y is H, alkali metal, or $NH_4$; and
(C) at least one monomer which comprises, in free-radically copolymerized form, at least two COOX groups, wherein X is H or a metal,
wherein at least one selected from the group consisting of monomer (B) and monomer (C) is metered into the reaction mixture during polymerization at a variable rate,
wherein the reaction mixture of the addition polymer P comprises no molecular weight regulator; and
wherein the addition polymer P comprises no vinyl aromatic monomers.

2. The dispersion of claim 1, wherein the monomer (B) comprises at least one selected from the group consisting of 2-acrylamido-2-methyl-propanesulfonic acid (AMPS), 3'-sulfopropyl methacrylate, 3'-sulfopropyl acrylate, and 2'-sulfoethyl methacrylate.

3. The dispersion of claim 1, wherein the polar monomer (C) comprises at least one selected from the group consisting of itaconic acid, aconitic acid, and mesaconic acid.

4. The dispersion of claim 1, wherein the dispersed addition polymer P comprises:
40% to 60% by weight of methyl methacrylate;
40% to 60% by weight of at least one selected from the group consisting of n-butyl acrylate and 2-ethylhexyl acrylate;
0.2% to 5% by weight of at least one monomer (B); and
0.2% to 5% by weight of at least one monomer selected from the group consisting of acrylic acid, methacrylic acid, itaconic acid, an alkali metal salt of acrylic acid, an alkali metal salt of methacrylic acid, an alkali metal salt of itaconic acid, an ammonium salt of acrylic acid, an ammonium salt of methacrylic acid, an ammonium salt of itaconic acid, acrylamide, and methacrylamide.

5. A method of manufacturing a coating material, the method comprising:
combining the dispersion of claim 1 with a coating material.

6. A method of manufacturing a binder, the method comprising:
combining the dispersion of claim 1 with a binder.

7. The method of preserving a mineral or nonmineral material, the method comprising:
contacting an addition comprising the dispersion of claim 1, with a mineral or nonmineral material.

8. A shaped mineral article, comprising a coating comprising the dispersion of claim 1.

9. A concrete roof tile, comprising a coating comprising the dispersion of claim 1.

10. A colored stone render, comprising the dispersion of claim 1.

11. A coating material, comprising the dispersion of claim 1.

12. A binder, comprising the dispersion of claim 1.

13. The dispersion of claim 1, wherein monomer (B) comprises 2-acrylamido-2-methyl-propanesulfonic acid (AMPS).

14. The dispersion of claim 1, wherein monomer (C) comprises itaconic acid.

15. The dispersion of claim 1, wherein metering in of all polar monomers is carried out at a gradient rate.

16. The dispersion of claim 15, wherein metering in of all non-polar monomers is carried out at a constant rate.

17. The dispersion of claim 1, wherein the variable rate is a gradient rate which is continually changing.

18. The dispersion of claim 1, wherein the variable rate is a gradient rate which changes stepwise.

19. The dispersion of claim 1, having a solids content above 20 wt. %.

20. The dispersion of claim 1, having a solids content from 40 to 60 wt. %.

* * * * *